(12) United States Patent
Tao et al.

(10) Patent No.: US 8,583,976 B2
(45) Date of Patent: Nov. 12, 2013

(54) HIERARCHY MANAGEMENT METHOD AND SYSTEM FOR HARQ MEMORY

(75) Inventors: Jianping Tao, Shenzhen (CN); Jiwen Wang, Shenzhen (CN)

(73) Assignee: ZTE Corporation, Shen Zhen, Guangdong Province (CN)

( * ) Notice: Subject to any disclaimer, the term of this patent is extended or adjusted under 35 U.S.C. 154(b) by 0 days.

(21) Appl. No.: 13/379,690

(22) PCT Filed: Oct. 25, 2010

(86) PCT No.: PCT/CN2010/078079
§ 371 (c)(1),
(2), (4) Date: Dec. 21, 2011

(87) PCT Pub. No.: WO2011/120298
PCT Pub. Date: Oct. 6, 2011

(65) Prior Publication Data
US 2013/0013970 A1    Jan. 10, 2013

(30) Foreign Application Priority Data
Apr. 2, 2010    (CN) .......................... 2010 1 0156547

(51) Int. Cl.
*H04L 1/18*    (2006.01)
*G08C 25/02*    (2006.01)
(52) U.S. Cl.
USPC ........................................ 714/748; 714/776
(58) Field of Classification Search
USPC .................. 714/748, 749, 758, 776
See application file for complete search history.

(56) References Cited

U.S. PATENT DOCUMENTS

2003/0033480 A1*    2/2003    Jeremiassen ................... 711/118
2008/0002629 A1*    1/2008    Roh et al. ....................... 370/335
(Continued)

FOREIGN PATENT DOCUMENTS

CN    101366225 A    2/2009
CN    100574169 C    12/2009

OTHER PUBLICATIONS

Frenger, P.; Parkvall, S.; Dahlman, E.; , "Performance comparison of HARQ with Chase combining and incremental redundancy for HSDPA," Vehicular Technology Conference, 2001. VTC 2001 Fall. IEEE VTS 54th , vol. 3, No., pp. 1829-1833 vol. 3, 2001.*

(Continued)

*Primary Examiner* — Cynthia Britt
(74) *Attorney, Agent, or Firm* — Ling Wu; Stephen Yang; Ling and Yang Intellectual Property LLC

(57) ABSTRACT

The invention provides a method for hierarchy management for a HARQ memory, wherein, the HARQ memory includes an on-chip memory including one or more storage blocks, each of which corresponds to a using status bit for indicating whether the storage block is overlayable. The method includes the following steps of: when receiving new data of a coded block, searching the on-chip memory for any overlayable storage block, and if there exists an overlayable storage block, storing the new data into the storage block and setting the using status bit corresponding to the storage block to be un-overlayable; if there is no overlayable storage block, storing the new data into an off-chip memory; and when the new data are checked and pass the check, setting the using status bit corresponding to the storage block in which the new data are stored to be overlayable. The invention also provides a corresponding system.

19 Claims, 7 Drawing Sheets

(56) References Cited

U.S. PATENT DOCUMENTS

| | | | |
|---|---|---|---|
| 2008/0276147 A1* | 11/2008 | Gho et al. | 714/748 |
| 2009/0059801 A1* | 3/2009 | Garrett et al. | 370/242 |
| 2009/0228755 A1* | 9/2009 | Franovici | 714/751 |
| 2010/0005356 A1* | 1/2010 | Cho et al. | 714/749 |
| 2011/0276852 A1* | 11/2011 | Mueller-Weinfurtner et al. | 714/749 |

OTHER PUBLICATIONS

Toumpakaris, D.; Jungwon Lee; Jang, E.W.; Hui-Ling Lou; , "Storage-performance tradeoff for receivers of MIMO systems using hybrid ARQ," Signal Processing Advances in Wireless Communications, 2008. SPAWC 2008. IEEE 9th Workshop on , vol., No., pp. 381-385, Jul. 6-9, 2008.*

International Search Report for PCT/CN2010/078079 dated Jan. 13, 2011.

* cited by examiner

HIERARCHY MANAGEMENT METHOD AND SYSTEM FOR HARQ MEMORY

TECHNICAL FIELD

The present invention relates to a method and a system for hierarchy management for a hybrid automatic repeat request (HARQ) memory in HARQ technology used in modern communication technology, such as 3G/high speed downlink packet access (HSDPA), long time evolution (LTE) and world interoperability for microwave access (WiMax).

BACKGROUND OF THE RELATED ART

Wireless telecommunication technology, such as HSDPA, begins to use hybrid automatic repeat request (HARQ) technology. When the received information after decoding has an error (for example, the error in cyclic redundancy check (CRC) check) due to existence of interference and fading of wireless channels, the receiving end may ask the sending end to resend the information to the receiving end, and the resent information may be the same with or different from the original information. The receiving end can combine the information received last time and the information that is currently resent for analysis, so as to obtain correct information. Since the original information needs to be retained to be combined with the resent information of the next time, this information needs to be stored by the memory.

The receiving end needs to use a memory to store all the error information packets, which are placed in a HARQ soft bit buffer or a HARQ memory. For a HSDPA with a low data velocity, such a memory used to store the HARQ information is small and may be implemented by a static random access memory (SRAM). When high speed data and various HARQ processes exist, sometimes such a memory is considerably big. For LTE technology, data velocity is very high, for example Category 3, whose data velocity is 50 Mbps for upstream and 100 Mbps for downstream, and whose total soft bit number for downstream is 1237248 (as shown in Table 1). If 8 bits are used to represent one soft bit, a 1.2 Mbyte memory is needed to support Category 3. Such a big memory (SRAM) used on the chip will increase the chip area and thus cause lack of competitiveness.

TABLE 1 downlink physical layer parameter values set by UE Category

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 302752 | 151376 | 3667200 | 4 |

To reduce the chip area, the HARQ memory can be implemented by an off-chip double data rate SDRAM (DDR)/synchronous dynamic random access memory (SDRAM). However, the implementation of the off-chip SDRAM takes up large bandwidth of DDR/SDRAM, and furthermore, the large quantity of accesses of the off-chip memory will directly increase the power consumption of the chip. Therefore, the existing HARQ memory needs to be improved urgently.

SUMMARY OF THE INVENTION

The technical problem to be solved by the invention is to provide a method and a system for hierarchy management for a HARQ memory to reduce area and power consumption.

To solve the above problem, the invention provides a method for hierarchy management for a HARQ memory, the method comprising:

the HARQ memory comprising an on-chip memory, and the on-chip memory comprising one or more storage blocks, each of which corresponds to a using status bit for indicating whether the storage block is overwriteable;

when receiving new data of a coded block, searching the on-chip memory for any overwriteable storage block, and if there exists an overwriteable storage block, storing the new data of the coded block into the storage block and setting the using status bit corresponding to the storage block to be un-overwriteable; if there is no overwriteable storage block, storing the new data of the coded block into an off-chip memory; and when the new data of the coded block are checked and pass the check, setting the using status bit corresponding to the storage block in which the new data of the coded block are stored to be overwriteable.

The above method may be further characterized in that, when receiving resent data of the coded block, performing processing on the coded block, comprising: judging whether previous data of the resent data is stored in the on-chip memory, if yes, reading the previous data from the on-chip memory, combining the resent data with the previous data thereof to obtain combined data; or else, reading the previous data corresponding to the resent data from the off-chip memory, and combining the resent data with the previous data to obtain combined data.

The above method may be further characterized in that, the processing performed on the coded block further comprises: when the previous data are in the on-chip memory, storing the combined data of the coded block into the storage block in which the previous data are stored; when the previous data are in the off-chip memory, searching the on-chip memory for any overwriteable storage block, if there exists an overwriteable storage block, storing the combined data of the coded block into the storage block and setting the using status bit corresponding to the storage block to be un-overwriteable; if there is no overwriteable storage block, storing the combined data of the coded block into the off-chip memory;

the method further comprises: when the combined data of the coded block passes check, setting the using status bit corresponding to the storage block in which the combined data of the coded block are stored to be overwriteable.

The above method may be further characterized in that, each storage block in the on-chip memory corresponding to a tag, in which identification information of the coded block stored in the storage block is stored;

the step of judging whether the previous data of the resent data are stored in the on-chip memory comprises:

when receiving the resent data of the coded block, searching for any tag corresponding to the identification information of the coded block, and if there exists a tag, the previous data being stored in the on-chip memory, and reading the previous data from a storage block corresponding to the tag.

The identification information is a process number of the coded block and a coded block number.

The above method may be further characterized in that, each coded block corresponds to one piece of check status identification information for indicating whether the coded block passes the check;

Prior to said step of performing processing on the coded block when receiving the resent data of the coded block, the method further comprises:

obtaining the check status identification information of the coded block, and skipping the coded block when the check status identification information indicates that the coded block passes the check; or else, performing processing on the coded block.

The above method may further comprise, setting an enforced processing identifier for indicating whether to perform an enforced combination processing;

prior to said step of obtaining the check status identification information of the coded block when receiving the resent data of the coded block, the method further comprises:

obtaining the enforced processing identifier, and if the enforced processing identifier indicates to perform enforced combination processing, executing the processing on the coded block; or else, obtaining the check status identification information of the coded block, and judging whether to perform processing on the coded block according to the check status identification information.

The above method may be further characterized in that, the check is a cyclic redundancy check.

The above method may be further characterized in that, a size of the storage block is fixed and no smaller than that of a biggest coded block; or, the size of the storage block is defined according to the size of the coded block.

The invention also provides a system for hierarchy management for a HARQ data, comprising a HARQ processor and an on-chip memory, the HARQ processor comprising a HARQ controller, wherein:

the on-chip memory comprises one or more storage blocks, and each storage block corresponds to a using status bit for indicating whether the storage block is overwriteable;

the HARQ controller is configured to: when receiving new data of a coded block, search the on-chip memory for any overwriteable storage block, and if there exists an overwriteable storage block, store the new data of the coded block into the storage block and set the using status bit of the storage block to be un-overwriteable; if there is no overwriteable storage block, store the new data of the coded block into an off-chip memory; write the new data of the coded block into a channel decoder, receive a check result of the coded block made by the channel decoder, and when the coded block passes check, set the using status bit corresponding to the storage block in which the new data of the coded block are stored to be overwriteable.

The above system may be further characterized in that, the HARQ processor further comprises a judging unit and a data combination processing unit, wherein:

the HARQ controller is further configured to: when receiving resent data of the coded block, instruct the judging unit to judge whether previous data of the resent data are stored in the on-chip memory;

the judging unit is configured to: when receiving an instruction of the HARQ controller, judge whether the previous data of the resent data are stored in the on-chip memory, and send a judging result to the data combination process unit;

the data combination process unit is configured to: when the previous data of the resent data are stored in the on-chip memory, read the previous data from the on-chip memory, combine the resent data and the previous data thereof to obtain combined data; or else, read the previous data corresponding to the resent data from the off-chip memory, and combine the resent data and the previous data to obtain the combined data.

The above system may be further characterized in that, the HARQ controller is further configured to: when the previous data are in the on-chip memory, store the combined data of the coded block obtained by the data combination process unit into a storage block in which the previous data are stored; when the previous data are in the off-chip memory, search the on-chip memory for any overwriteable storage block, and if there exists an overwriteable storage block, store the combined data of the coded block into the storage block and set a using status bit corresponding to the storage block to be un-overwriteable; if there is no overwriteable storage block, store the combined data of the coded block into the off-chip memory; when the combined data of the coded block are checked and pass the check, set the using status bit corresponding to the storage block in which the combined data of the coded block are stored to be overwriteable.

The above system may be further characterized in that, the judging unit comprises a tag register and a tag comparator, each storage block in the on-chip memory corresponds to a tag in the tag register, and identification information of the coded block stored in the storage block is stored in the tag;

the tag comparator is configured to: when receiving an instruction of the HARQ controller, search for any tag corresponding to the identification information of the coded block exists, and send a searching result to the data combination process unit;

the data combination process unit is further configured to: when a tag corresponding to the identification information of the coded block exists in the tag register, read the previous data of the coded block from the storage block corresponding to the tag; combine the resent data with the previous data; or else, read the previous data corresponding to the resent data from the off-chip memory, and combine the resent data with the previous data.

The above system may be further characterized in that, the identification information is a process number of the coded block and a coded block number.

The above system may be further characterized in that, the HARQ processor further comprises a check status register, wherein:

the check status register is configured to: store check status identification information of each coded block, which is used to indicate whether the coded block passes the check;

the HARQ controller is further configured to: set the check status identification information of the coded block according to the check result of the coded block made by the channel decoder, and when receiving the resent data of the coded block, obtain the check status identification information of the coded block, and skip the coded block when the check status identification information indicates that the coded block passes the check; or else, obtain the previous data of the coded block, and perform combination processing on the resent data and the previous data.

The above system may be further characterized in that, the HARQ processor further comprises an enforced processing register, which is configured to: store an enforced processing identifier, which is used to indicate whether to perform enforced combination processing;

the HARQ controller is configured to: when receiving the resent data of the coded block, obtain the enforced processing identifier, and if the enforced processing identifier indicates to perform enforced combination processing, perform combination processing on of the resent data and the previous data; or else, obtain the check status identification information of the coded block, and judge whether to perform combination processing on the resent data and the previous data according to the check status identification information of the coded block.

The above system may be further characterized in that, the check is a cyclic redundancy check.

The method for hierarchy management in the invention improves the utility of the on-chip SRAM, and reduces power consumption.

PREFERRED EMBODIMENTS OF THE PRESENT INVENTION

Figure 1:
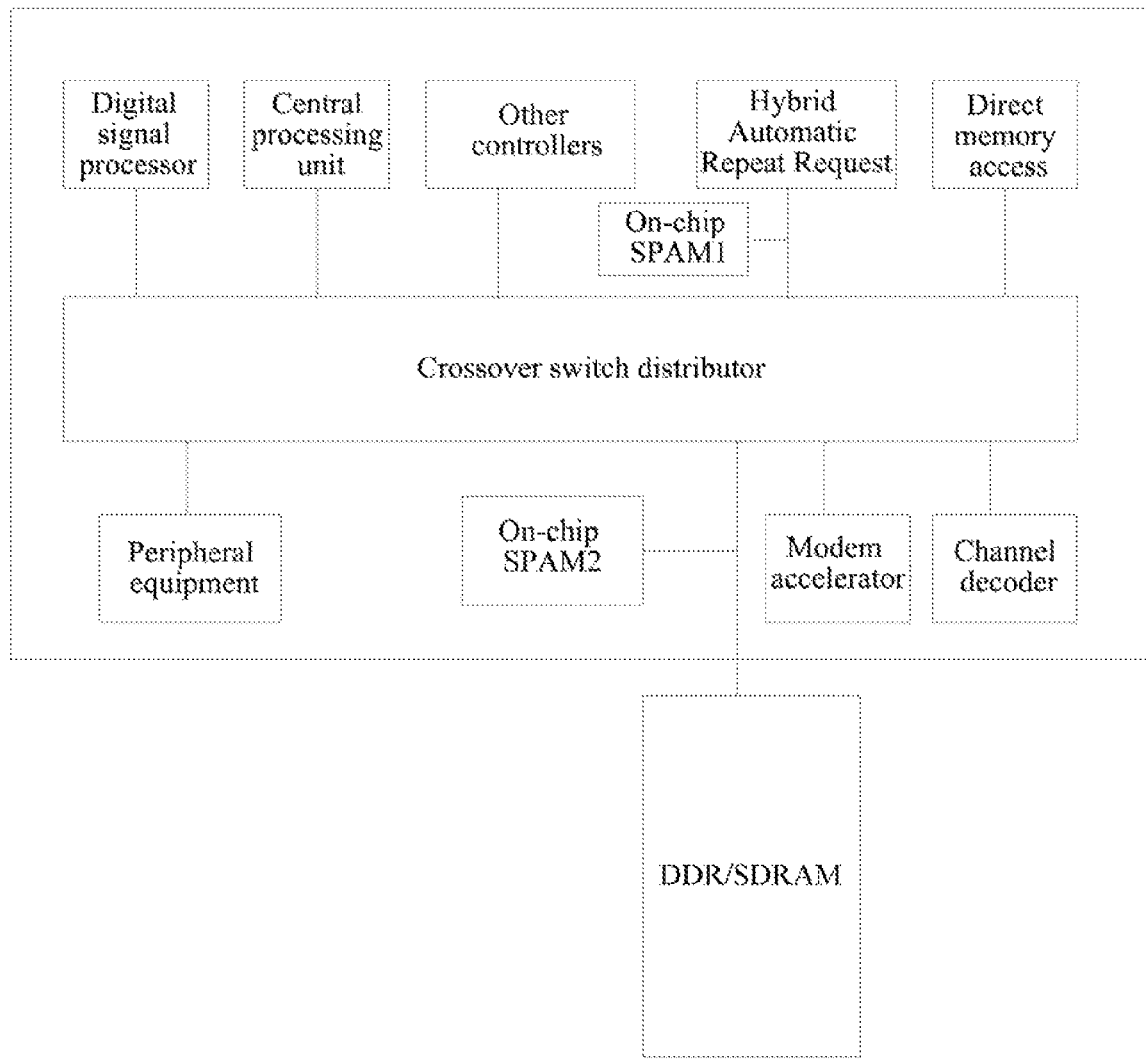
FIG. 1 is a general architecture for a SOC base band chip of a multi-core processor.

The invention provides a method for hierarchy storage with partial storage in an on-chip SRAM and partial storage in an off-chip DDR/SDRAM to reduce chip area and power consumption. To use sufficiently the utility of the on-chip SRAM and the big volume and low cost of the off-chip DDR/SDRAM, a method for implementing dynamic assignment of memories is provided.

The invention is based on a coded block (CB), and the processing on a transmitting block composed of a plurality of coded blocks includes processing on each coded block followed by an overall processing on the transmitting block (such as CTC check of the transmitting block). The on-chip SARM may be used to store the soft bit data of a plurality of coded blocks.

The on-chip SRAM comprises a plurality of storage blocks, and each storage block corresponds to a tag (Tag), which can be implemented by a memory or register. The tag is used to record the identification information of the data stored in a certain storage block. For example, a tag may store high address used for tag inquiry when the data are read.

Each storage block further corresponds to a using status bit (CB_used), which is used to indicate whether the storage block may be overlaid by new data. When new data are processed, if a certain storage block of the on-chip SRAM stores data, and the CRC check is correct after a channel decoder decodes, the storage block can be released, and the data of another coded block can use the resources and overlay the storage block to improve the utility. The using status bit (CB_used) is used to indicate whether the storage block may be overlaid. When being reset, the using status bit of each storage block in the on-chip SRAM indicates to be overwriteable.

The invention also comprises a coded block CRC status register (CB_CRC_Statu_Reg), which is used to indicate the CRC status of all the coded blocks. The status register is set by its corresponding CRC result. If the bit of the status register is 1, it indicates that the CRC of the coded block is in error, and if the bit of the status register is 0, it indicates that the CRC of the coded block is correct. The coded block CRC status register can be used to control the data processing in retransmission in the system control. If the bit is 1 during retransmission, the corresponding coded block will be processed normally; if the bit is 0 during retransmission, the corresponding coded block may not be processed, thus saving the power consumption.

The invention also comprises a tag comparator. When the data are resent, the newly received resent data of the coded block and the previous data stored in the memory need to be combined, and the combined data obtained after the combination are decoded. When the previous data are read, whether the previous data are in the on-chip SRAM should be firstly checked, if yes, the data are read from the on-chip SRAM; if not, the data in the off-chip DDR/SDRAM are read. When judging whether the previous data are in the on-chip SRAM, the tag comparator plays a role of providing an indication as to whether the previous data are in the on-chip SRAM. The tag comparator compares the high address of the coded block with the tag value stored in the memory or register, and if there are the same values, i.e. tag hit, it suggests that the data are in the on-chip SRAM; if it indicates tag miss, i.e. the data are not in the on-chip SRAM, it needs to read the data in the off-chip DDR/SDRAM.

The invention also comprises an on-chip read buffer area (Read Buffer, such as FIFO and so on). The function of the on-chip read buffer area is to read the data received last time from the off-chip DDR/SDRAM in a case of Tag Miss.

The invention also comprises an on-chip write buffer area (write Buffer, such as FIFO and so on). During the processing on the coded block, if the using status bits of all the storage blocks in the on-chip SRAM indicate un-overwriteable (or referred to as being used), the control logic will write the soft bit corresponding to the coded block into the on-chip write buffer area. The on-chip write buffer area then writes this section of data into the off-chip DDR/SDRAM.

The invention also comprises a data combination processing unit, whose function is to combine the resent data and the previous data of the coded blocks.

The invention also comprises an overall controller, which is used to process the control of the whole transmitting block, comprising processing the new and resent data, data reading and wiring, the processing of tags, operations of read and write buffer and so on.

For the coded blocks of the off-chip DDR/SDRAM, the corresponding using status can also be set as the on-chip SRAM. To simplify the design, the using status bit may also not be set, since the volume of the DDR/SDRAM is large and a location may be designated for each coded block, and thereby the reuse may not be considered.

The invention will be further illustrated in detail below with reference to the accompanying drawings and the examples.

FIG. 1 is a general architecture for a system-grade chip or system on chip (SOC) base band chip of multi-core processor. In the specific instance, the SOC base band chip comprises a digital signal processor (DSP) and a CPU (such as ARM processor), a DMA (direct memory access), peripherals, a modem accelerator, and a channel decoder (Turbo, CRC and so on). HARQ is part of modem accelerator, and may be used as a bus controller. SRAM is an on-chip memory.

Figure 2:
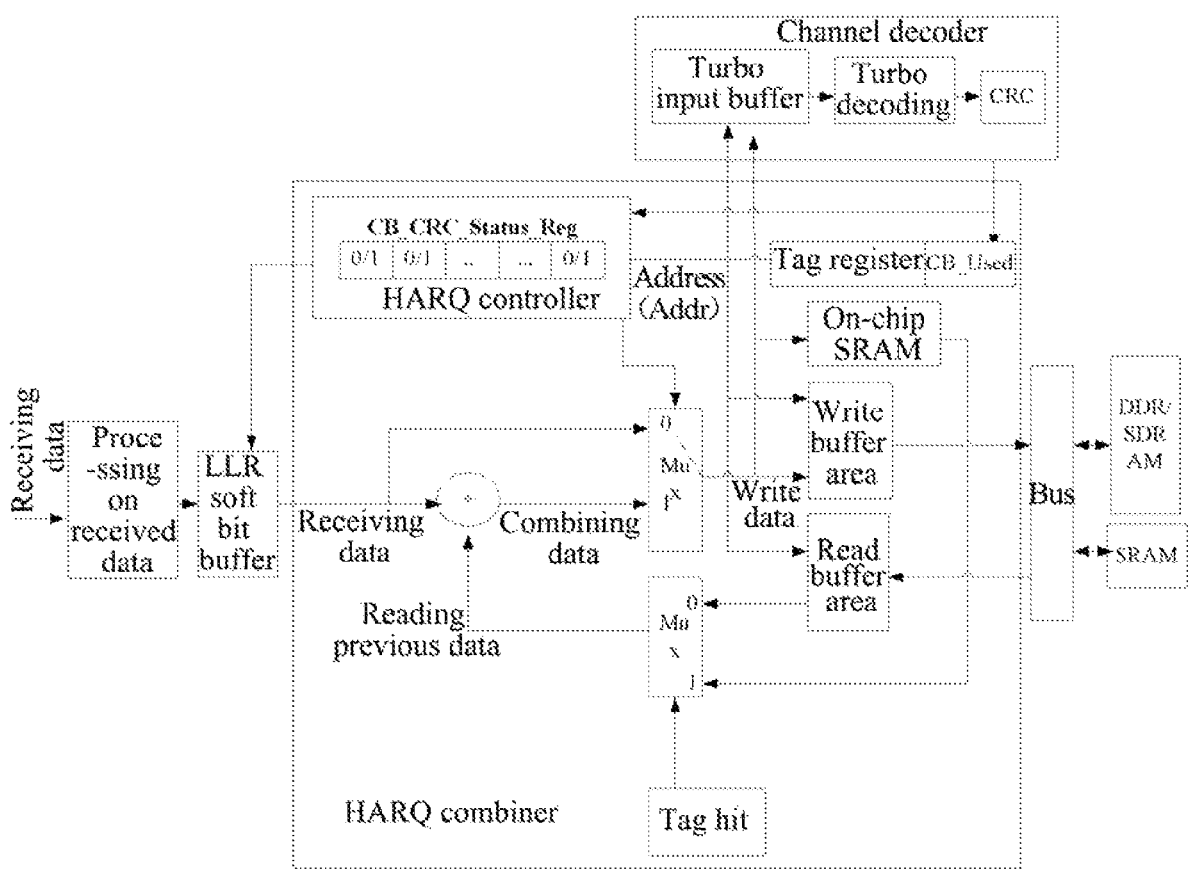
FIG. 2 is an architecture diagram of a HARQ combiner with memory hierarchy in the invention.

FIG. 2 is an architecture diagram of a HARQ combiner with memory hierarchy. It can be seen from the diagram that the received data, herein referred to I, Q data received from the radio frequency, passes through ADC (digital-analog conversion), filtering, and forward processing such as channel estimation, MIMO, balancer, and so on, and then generate a LLR (log likelihood ratio) soft bit, which is stored in a buffer. The HARQ combiner generates a control signal to read the soft bit data from the buffer according to the initial address, data block size and status (new data or resent data) and so on of a CB block and the current process.

The HARQ combiner has an interface to the channel decoder. The HARQ combiner transmits the LLR soft bit to the channel decoder, which returns a CRC result to the HARQ combiner.

The association between the HARQ and external SRAM, DDR/SDRAM is achieved by the bus interface, such as an advanced extensible interface (ARM AXI) bus, or a specified bus.

Wherein, the HARQ combiner comprises a HARQ processor and an on-chip memory, wherein, the HARQ processor further comprises a HARQ controller, a using status bit register, a judging unit (comprising a tag register and a tag comparator), a data combination processing unit, an coded block CRC status register, an on-chip write buffer area, and an on-chip read buffer area, wherein:

the on-chip memory comprises a plurality of storage blocks, and each block corresponds to a using status bit, which is used to indicate whether the storage block is overwriteable; the using status bit is stored in the using status bit register;

each storage block further corresponds to a tag in the tag memory, and the identification information of the coded block stored in the storage block of the on-chip memory is stored in the tag, and the identification information may be the high address of the coded block, such as the process number and the coded block number of the coded block;

the coded block CRC status register is used to store the CRC status identification information of each coded block, and the CRC status identification information is used to indicate whether the coded block has passed the CRC check;

the HARQ controller is used to perform HARQ processing, search the on-chip memory for any overwriteable storage block when receiving new data of the coded block, and if there exists an overwriteable storage block, store the new data of the coded block into the storage block and set the using status bit of the storage block to be un-overwriteable; if there is no overwriteable storage block, store the new data of the coded block into the off-chip memory; it is further used to write the new data of the coded block into the channel decoder, receive the CRC check result of the coded block made by the channel decoder, and when the coded block passes the CRC check, set the using status bit corresponding to the storage block storing the new data of the coded block to be overwriteable;

wherein, the HARQ controller is further used to instruct the judging unit, when receiving the resent data of the coded block, to judge whether the previous data of the resent data are stored in the on-chip memory;

the judging unit, is used to judge whether the previous data of the resent data are stored in the on-chip memory when receiving the instruction of the HARQ controller, and send the judging result to the data combination process unit;

the data combination process unit is used to, when the previous data of the resent data are stored in the on-chip memory, read the previous data from the on-chip memory, combine the resent data and the previous data thereof to obtain combined data; or else, read the previous data corresponding to the resent data from the off-chip memory, and combine the resent data and the previous data to obtain the combined data.

The HARQ controller is further used to, when the previous data are in the on-chip memory, store the combined data of the coded block obtained by the data combination process unit into a storage block in which the previous data are stored; when the previous data are in the off-chip memory, search the on-chip memory for any overwriteable storage block, and if there exists an overwriteable storage block, store the combined data of the coded block into the storage block and set the using status bit corresponding to the storage block to be un-overwriteable; if there is no overwriteable storage block, store the combined data of the coded block into the off-chip memory; when the combined data of the coded block are checked and pass the check, set the using status bit corresponding to the storage block in which the combined data of the coded block are stored to be overwriteable.

The judging unit comprises a tag register and a tag comparator, wherein, each storage block in the on-chip memory corresponds to a tag in the tag register, and the identification information of the coded block stored in the storage block is stored in the tag;

the tag comparator is used to, when receiving an instruction of the HARQ controller, search for any tag corresponding to the identification information of the coded block exists, and send the searching result to the data combination process unit;

the data combination process unit is used to, when a tag corresponding to the identification information of the coded block exists in the tag register, read the previous data of the coded block from the storage block corresponding to the tag; combine the resent data with the previous data; or else, read the previous data corresponding to the resent data from the off-chip memory, and combine the resent data with the previous data. The identification information of the coded block is a process number of the coded block and a coded block number.

the HARQ controller is further used to set the CRC status identification information of the coded block according to the CRC check result of the coded block made by the channel decoder, and it is further used to, when receiving the resent data of the coded block, obtain the CRC status identification information of the coded block, and skip the coded block when the CRC status identification information indicates that the coded block passes the CRC check; or else, obtain the previous data of the coded block, and perform combination processing on the resent data and the previous data.

The HARQ processor further comprises an enforced processing register. The enforced processing register is used to store an enforced processing identifier, which is configured to indicate whether to perform enforced combination processing;

the HARQ controller is used to, when receiving the resent data of the coded block, obtain the enforced processing identifier, and if the enforced processing identifier indicates to perform enforced combination processing, perform combination processing on the resent data and the previous data; or else, obtain the CRC status identification information of the coded block, and judge whether to perform combination processing on the resent data and the previous data according to the CRC status identification information of the coded block.

Figure 3:
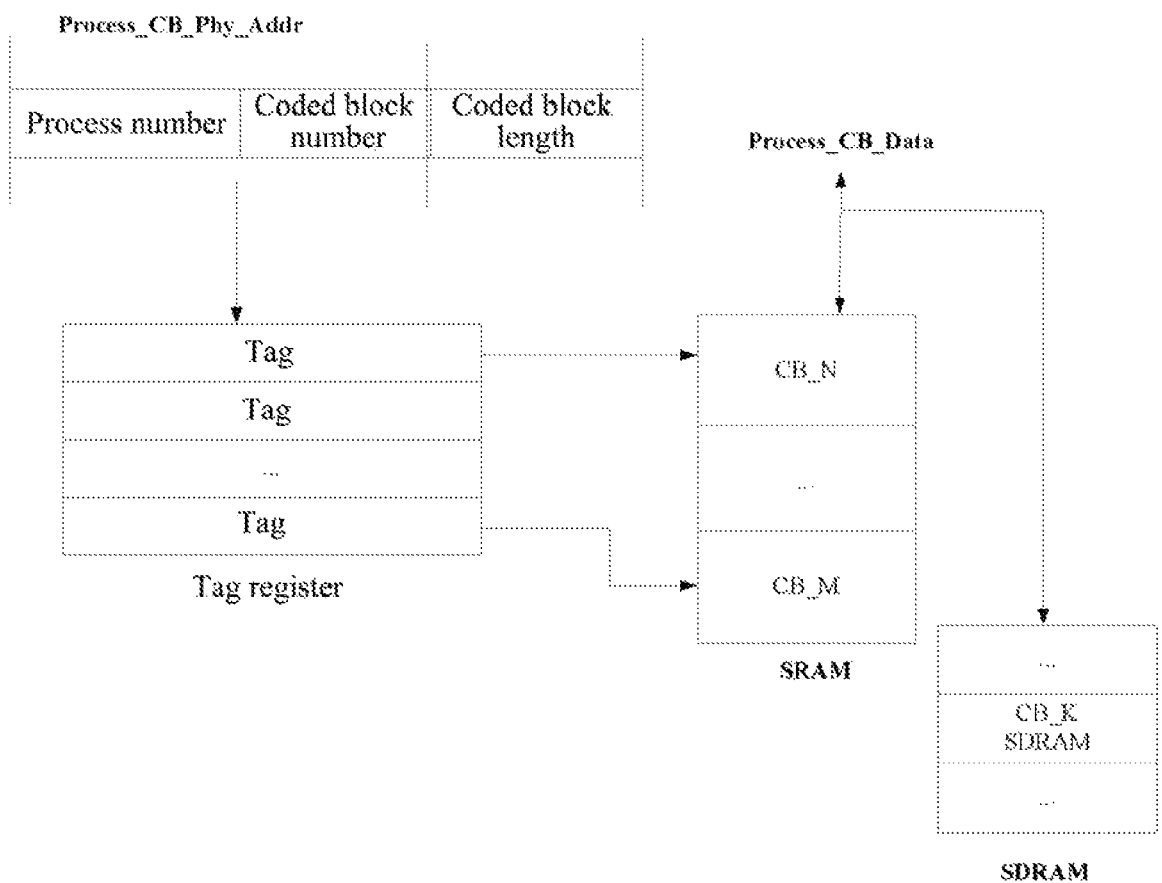
FIG. 3 illustrates the HARQ address, TAG RAM, data SRAM and SDRAM in the invention.

FIG. 3 describes the HARQ address, TAG RAM, data SRAM and SDRAM. The physical address of the CB block of the HARQ is divided, wherein the Tag section is stored in a Tag RAM, and the data are stored in a data RAM (SRAM or DDR/SDRAM), as shown in FIG. 3.

The physical address of the CB block of each HARQ process may be composed of a HARQ process ID, a CB block number and a CB block length. To illustrate simply, it is assumed that each CB is assigned with a maximum CB block length (we can see from below that the lengths of CB blocks may be different). The process ID and CB block number may constitute a TAG of a CB. When the data of a CB block are stored in a SRAM, the corresponding TAG is stored in a TAG RAM. When the data of a CB block are stored in an off-chip SDRAM, no TAG is needed.

Figure 4:
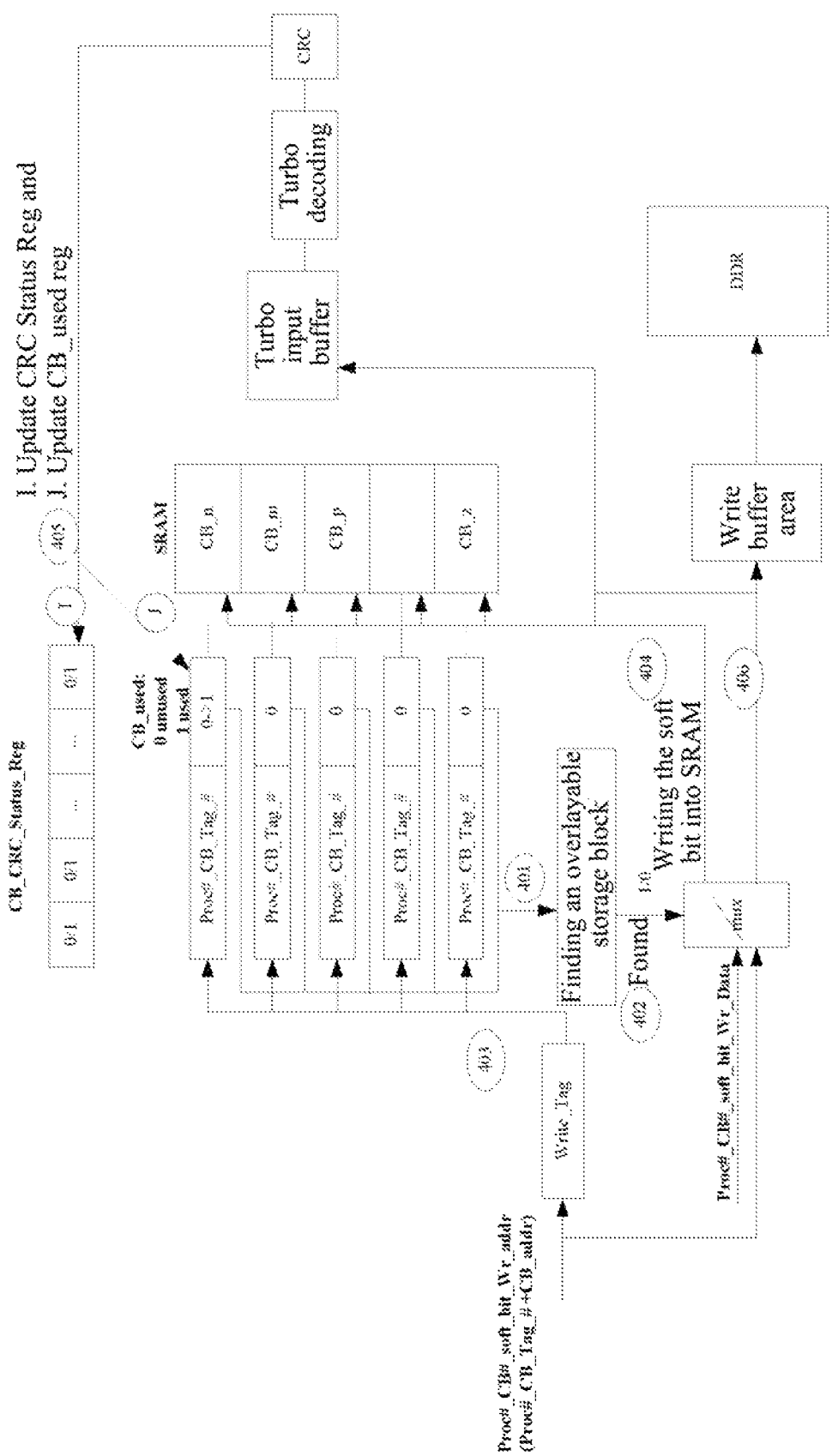
FIG. 4 is the write control logic of the hierarchy memory in the invention.

FIG. 4 describes the write control logic of the hierarchy memory in the invention.

Step 401, by taking a received new data for instance, the control logic firstly looks over the using status bit register when processing a coded block, and judges whether an over-writeable storage block exists in the on-chip SRAM.

Step 402, if yes, it suggests that a location that is not taken up is found, and go to step 403; if not, i.e. all the storage blocks in the on-chip SRAM are taken up, go to step 406.

Step 403, the high address of the CB block corresponding to the HARQ process is locked into the tag register, and the corresponding using status bit (CB_used) is set to be 1, indicating that the storage block of SRAM is taken up.

Step 404, the received soft bit data may be written into the corresponding storage block of the on-chip SRAM, and meanwhile the data may also be written into the input buffer of the decoder (Turbo) for the purpose of decoding.

Step 405, after the decoding of the CB block by the decoder is completed, CRC check is then performed, and the following operations are executed after the CRC check is completed:

setting the corresponding bit of the coded block CRC status register (CB_CRC_Statu_Reg) to 0 if the CRC is passed and 1 if the CRC is in error;

updating the using status bit (CB_used): setting to 0 if the CRC is passed and 1 if the CRC is in error.

By now, the processing on the CB block is completed, which may be followed by the processing on the next CB block.

Step 406, entering this step suggests that the whole on-chip SRAM is taken up, the data of the CB block needs to be written into the WB (write buffer) and the WB inputs the data into the external DDR/SDRAM. The data of the CB block may be also written into the input buffer of the decoder (Turbo) for decoding After decoding of the CB block by the decoder is completed, the CRC check is then performed, and the following operations are executed after the CRC check is completed:

setting the corresponding bit of the coded block CRC status register (CB_CRC_Statu_Reg) to 0 if the CRC is passed and 1 if the CRC is in error.

By now, the process of the CB block is completed, and it may go to the process of next CB block.

Figure 5:
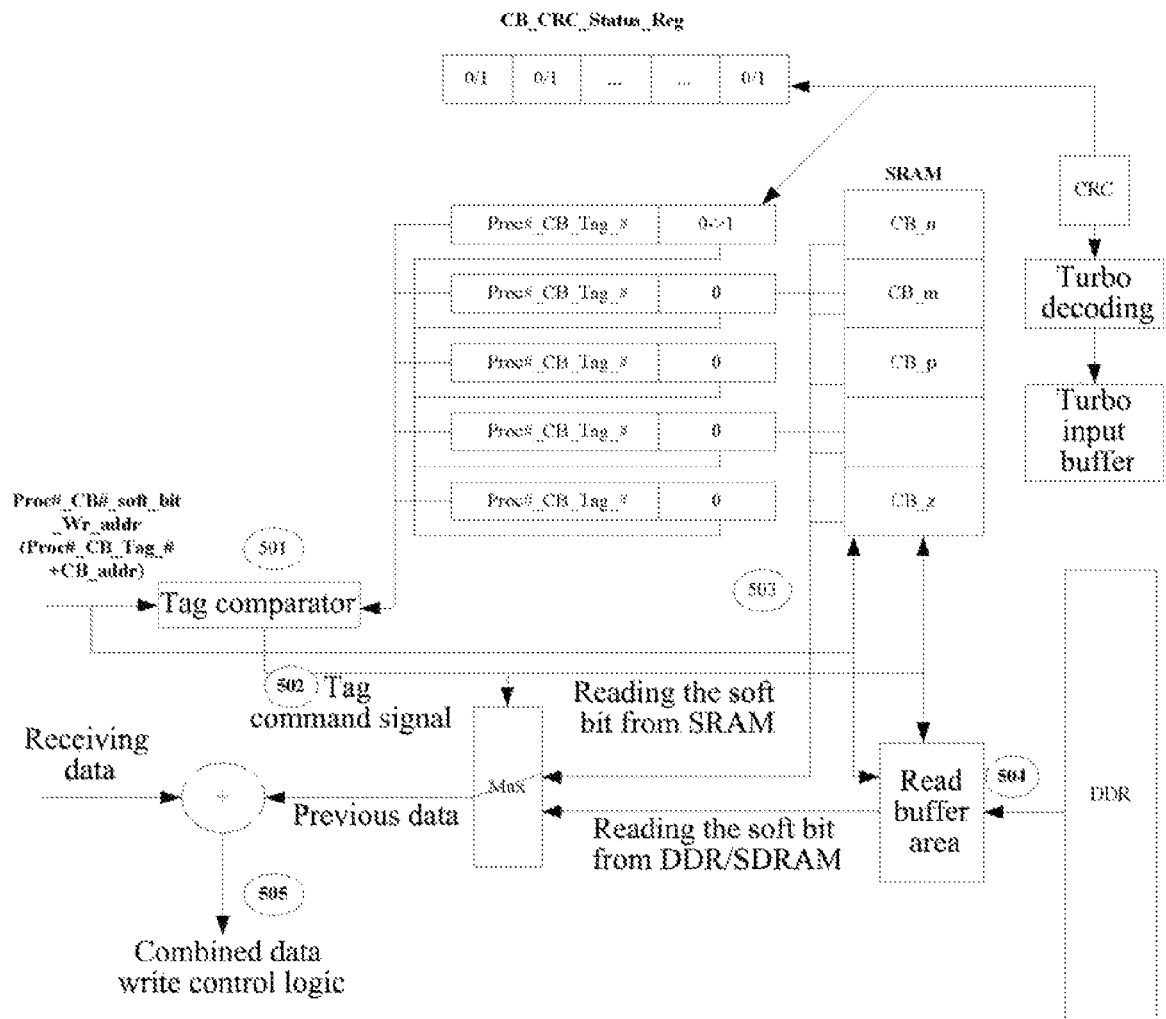
FIG. 5 is the read control logic of the hierarchy memory in the invention.

FIG. 5 describes the read control logic of the hierarchy memory in the invention. Taking the received resent data for instance, when processing a coded block, the newly received data needs to be combined with the data previously received (the previous data for short) stored in the memory. The control logic firstly needs to make a search as to whether the previous data are in the on-chip SRAM, and if yes, it reads the previous data from the on-chip SRAM; or else, it reads the previous data from the external DDR/SDRAM. The steps are as follows:

step 501, when receiving the resent data, the high address of the current CB block is compared with the address stored in each tag in the tag register, and it suggests that the previous data are stored in the on-chip SRAM if the same address is found (hit in the tag register, i.e. Tag hit), or else it suggests that the previous data are stored in the external DDR/SDRAM if the tag is missed (Tag miss);

step 502, a Tag hit signal, which is used to select Mux and the data read from the on-chip SRAM or the external DDR/SDRAM, is output according to the comparison result;

step 503, if the Tag hit signal indicates a tag is hit (Tag hit), the previous data are read from the on-chip SRAM;

step 504, if the Tag hit signal indicates a tag is missed (Tag miss), the previous data are read from the external DDR/SDRAM through the read buffer (RB);

step 505, the resent data and the previous data are combined, and the combined data need to be transmitted to the decoder to be decoded and stored in the memory; the specific storage method is as follows:

when the previous data are in the on-chip memory, the combined data of the coded block are stored into the storage block storing the previous data;

when the previous data are in the off-chip memory, whether an overwriteable storage block exists in the on-chip memory is checked, and if yes, the combined data of the coded block are stored into the storage block and the using state bit corresponding to the storage block is set to be un-overwriteable; if not, the combined data of the coded block are stored into the off-chip memory;

when the combined data of the coded block passes the CRC check, the using state bit corresponding to the storage block storing the combined data of the coded block is set to be overwriteable.

Figure 6:
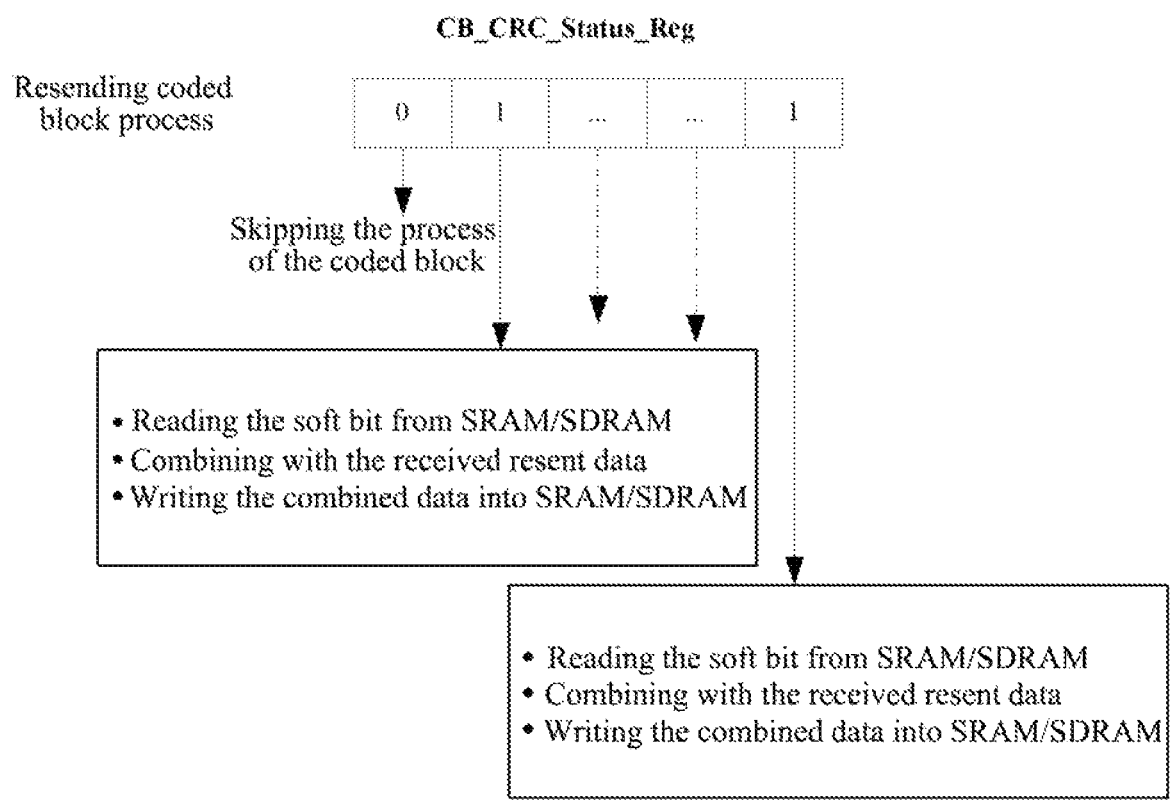
FIG. 6 further describes the control of the hierarchy memory in the invention.

FIG. 6 further describes the control of the hierarchy memory in the invention.

For the new data, each CB block needs to be processed; while for the resent data, a CB block with a correct CRC does not need to be processed. The new data processing procedures are shown in FIG. 4. When the resent data of a CB are processed (as shown in FIG. 5 and FIG. 4), the information (which is transmitted by the CRC module) of the coded block CRC status register (CB_CRC_Statu_Reg) is checked firstly; if the CRC of the CB is correct (such as the CRC status is 0), the CB does not need to be processed; if the CRC status is 0, which suggests that the last CRC is correct, there is no need to perform processing; if the CRC of the CB is wrong (for example the CRC status is 1), the CB block needs to be processed.

A CB_Force register may be also designed to enforce the operation for the resent data. When the CB_Force of a CB block is set to 1, the CB block is regarded as to be wrong, and a CB block with a correct CRC originally also needs to be processed again. This applies to special cases where the CRCs of all the CB blocks are correct, but the CRC of a transmitting block (TB) is wrong. The register does not play a role of controlling when the CB_Force is 0.

It needs to be explained that during an implementation process, the size of the storage block in the on-chip SRAM is fixed, for example the size of the biggest CB block is taken. In this way, the design may be simplified, and a Tag comparison may be performed when the CB begins to process with no need to check TAG every time of reading and writing, thereby reducing the power consumption of this section.

The storage block size in the on-chip SRAM may be unfixed and determined according to the size of a CB block. It is usually suggested that the storage block size is defined initially and the setting continues to be used subsequently, in which case the utilization of the storage space of the SRAM is high (the storage space may be even fully used). The weakness of the method is that during the operation process, due to change of the CB block size in the current process, such a condition may sometimes occurs: only part of the data of a certain CB block is stored in a SRAM (the size of the storage block originally defined is smaller than the size of the current CB block), and the other part of the data will be stored in the external SDRAM, which may be done automatically due to the presence of the Tag and thus has no problem in processing. Because a comparison of Tag is needed every time of reading and writing to judge which memory the data are (written, read) in, such a method may make full use of SRAM. It needs to be explained that the external DDR/SDRAM sets aside the space for each HARQ process no matter whether an on-chip SRAM is used, to ensure the data which can not be stored in the SRAM may be stored in the external DDR/SDRAM.

Figure 7:
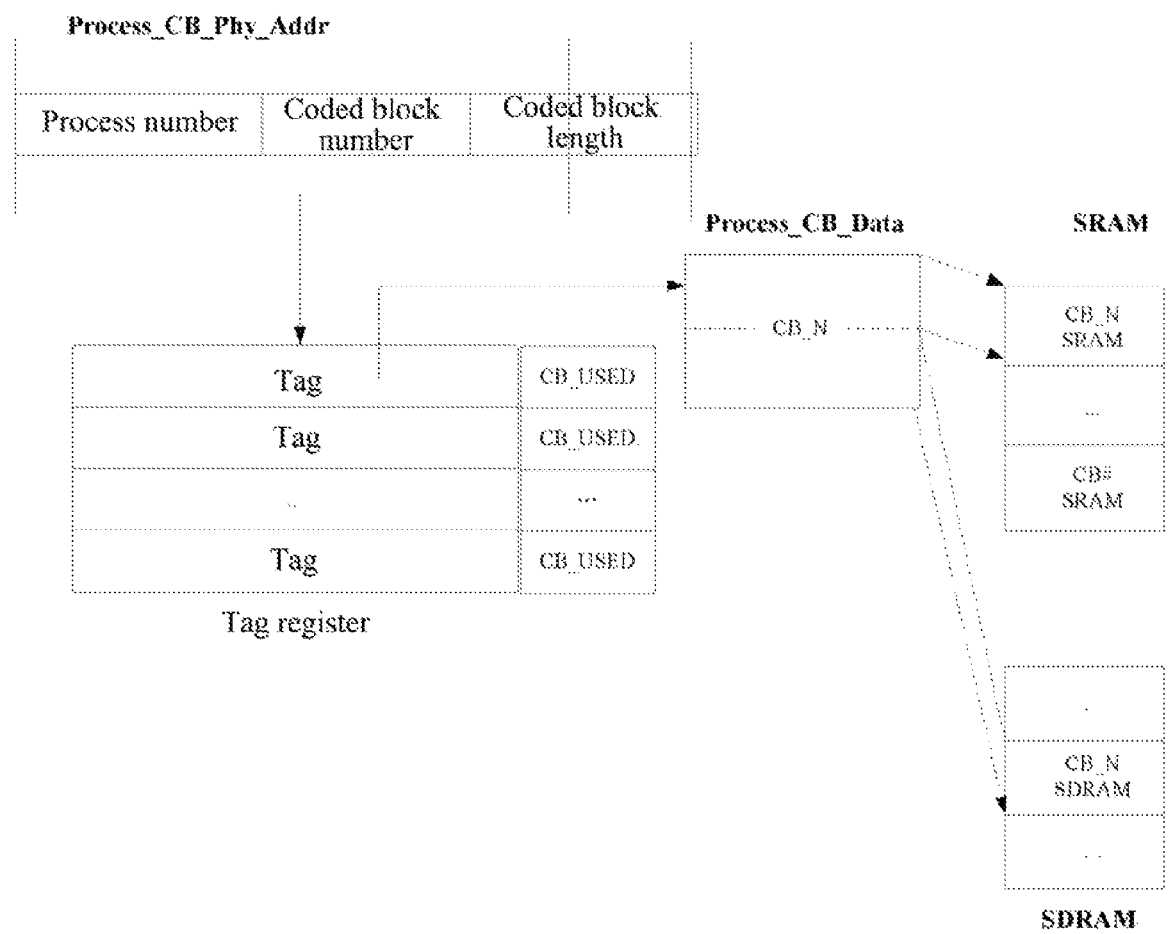
FIG. 7 illustrates the case where the same CB is in the SRAM and SDRAM.

FIG. 7 uses an instance to describe the case where a CB block is both in an on-chip SRAM and an off-chip DDR/SDRAM. When the previously assigned space size for a storage block is smaller than that of the currently processed CB block, only part of the data can be reserved in the on-chip SRAM, and the other data may be written into the off-chip DDR/SDRAM. Since TAG comparison is implemented in real time, Tag values are compared every time of reading and writing, and when there are the same TAGs, the data are stored in the on-chip SRAM, or else in the external DDR/SDRAM. Sine different lengths of the storage block can be defined initially, the corresponding TAG bit widths can be different, i.e. a tag may be the process number of a coded block, a coded block number and part of a coded block length.

Wherein, in this case, when new data are received or the combined data are stored, whether an overwriteable storage block exists in the on-chip memory is checked:

when there is an overwriteable storage block, part of the data of the coded block is stored into the storage block and the using status bit corresponding to the storage block is set to be un-overwriteable, while the other part of the data of the coded block is stored into the external memory, and an indication as to whether the data of the coded block are all stored in the on-chip memory is provided in the system;

when there is no overwriteable storage block, the data of the coded block are stored into the external memory;

when the resent data are received:

in a case of TAG HIT, after part of the data is obtained from the on-chip memory, the other part of the data is obtained from the off-chip memory if the system indicates that only part of the data of the coded block is stored in the on-chip memory;

in a case of TAG MISS, the data directly is obtained from the off-chip memory.

In the above examples, description is made by taking performing CRC check on the coded block for instance, and the invention is also applicable when other check modes are used.

The data involved in the invention may be the data before or after rate de-matching depending on the difference of information processing sequences. The invention is applicable for implementing HARQ with hardware, and the HARQ implemented by the hardware may include programmable or unprogrammable control components.

INDUSTRIAL APPLICABILITY

The method for hierarchy storage in the invention improves the utility of the on-chip SRAM, and reduces the power consumption.

What is claimed is:

1. A method for hierarchy management for a hybrid automatic repeat request (HARQ) memory, comprising the following steps of:

the HARQ memory comprising an on-chip memory, and the on-chip memory comprising one or more storage blocks, each of which corresponds to a using status bit for indicating whether the storage block is overlayable;

when receiving new data of a coded block, searching the on-chip memory for any overlayable storage block, and if there exists an overlayable storage block, storing the new data of the coded block into the storage block and setting the using status bit corresponding to the storage block to be un-overlayable; if there is no overlayable storage block, storing the new data of the coded block into an off-chip memory; and when the new data of the coded block are checked and pass the check, setting the using status bit corresponding to the storage block in which the new data of the coded block are stored to be overlayable;

and the method further comprising:

storing a piece of check status identification information corresponding to each coded block, the check status identification information indicating whether the coded block passes the check; and prior to performing combination processing on the coded block when receiving resent data of the coded block, obtaining the check status identification information corresponding to the coded block, and skipping the coded block when the check status identification information indicates that the coded block passes the check; when the check status identification information indicates that the coded block does not pass the check, performing the combination processing on the coded block.

2. The method according to claim 1, wherein, the combination processing on the coded block when receiving the resent data of the coded block comprises: judging whether previous data of the resent data is stored in the on-chip memory, if yes, reading the previous data from the on-chip memory, combining the resent data with the previous data thereof to obtain combined data; or else, reading the previous data corresponding to the resent data from the off-chip memory, and combining the resent data with the previous data to obtain combined data.

3. The method according to claim 2, wherein, the combination processing on the coded block further comprises: when the previous data are in the on-chip memory, storing the combined data of the coded block into the storage block in which the previous data are stored; when the previous data are in the off-chip memory, searching the on-chip memory for any overlayable storage block, if there exists an overlayable storage block, storing the combined data of the coded block into the storage block and setting the using status bit corresponding to the storage block to be un-overlayable; if there is no overlayable storage block, storing the combined data of the coded block into the off-chip memory;

the method further comprises: when the combined data of the coded block passes check, setting the using status bit corresponding to the storage block in which the combined data of the coded block are stored to be overlayable.

4. The method according to claim 3, wherein, each storage block in the on-chip memory corresponding to a tag, in which identification information of the coded block stored in the storage block is stored;

the step of judging whether the previous data of the resent data are stored in the on-chip memory comprises:

when receiving the resent data of the coded block, searching for any tag corresponding to the identification information of the coded block, and if there exists a tag, the previous data being stored in the on-chip memory, and reading the previous data from a storage block corresponding to the tag.

5. The method according to claim 4, wherein, the identification information is a process number of the coded block and a coded block number.

6. The method according to claim 2, wherein,
each storage block in the on-chip memory corresponding to a tag, in which identification information of the coded block stored in the storage block is stored;
the step of judging whether the previous data of the resent data are stored in the on-chip memory comprises:
when receiving the resent data of the coded block, searching for any tag corresponding to the identification information of the coded block, and if there exists a tag, the previous data being stored in the on-chip memory, and reading the previous data from a storage block corresponding to the tag.

7. The method according to claim 6, wherein, the identification information is a process number of the coded block and a coded block number.

8. The method according to claim 1, further comprising:
setting a enforced processing identifier for indicating whether to perform an enforced combination processing;
prior to said step of obtaining the check status identification information corresponding to the coded block when receiving the resent data of the coded block, the method check further comprises:
obtaining the enforced processing identifier, and if the enforced processing identifier indicates to perform enforced combination processing, executing the combination processing on the coded block; or else, obtaining the check status identification information corresponding to the coded block, and judging whether to perform the combination processing on the coded block according to the check status identification information.

9. The method according to claim 1, wherein, the check is a cyclic redundancy check.

10. The method according to claim 1, wherein, a size of the storage block is fixed and no smaller than that of a biggest coded block; or, the size of the storage block is defined according to the size of the coded block.

11. A system for hierarchy management for a HARQ data, comprising a HARQ processor and an on-chip memory, the HARQ processor comprising a HARQ controller, wherein:
the on-chip memory comprises one or more storage blocks, and each storage block corresponds to a using status bit for indicating whether the storage block is overlayable;
the HARQ controller is configured to: when receiving new data of a coded block, search the on-chip memory for any overlayable storage block, and if there exists an overlayable storage block, store the new data of the coded block into the storage block and set the using status bit of the storage block to be un-overlayable; if there is no overlayable storage block, store the new data of the coded block into an off-chip memory; write the new data of the coded block into a channel decoder, receive a check result of the coded block made by the channel decoder, and when the coded block passes check, set the using status bit corresponding to the storage block in which the new data of the coded block are stored to be overlayable;
wherein the HARQ processor further comprises a check status register, wherein:
the check status register is configured to: store check status identification information corresponding to each coded block, the check status identification information indicating whether the coded block passes the check;
the HARQ controller is further configured to: set the check status identification information corresponding to the coded block according to the check result of the coded block made by the channel decoder, and when receiving resent data of the coded block, obtain the check status identification information corresponding to the coded block, and skip the coded block when the check status identification information indicates that the coded block passes the check; when the check status identification information indicates that the coded block does not pass the check, obtain previous data of the coded block, and perform combination processing on the resent data and the previous data.

12. The system according to claim 11, wherein,
the HARQ processor further comprises a judging unit and a data combination processing unit, wherein:
the HARQ controller is further configured to: when receiving the resent data of the coded block, instruct the judging unit to judge whether the previous data of the resent data are stored in the on-chip memory;
the judging unit is configured to: when receiving an instruction of the HARQ controller, judge whether the previous data of the resent data are stored in the on-chip memory, and send a judging result to the data combination process unit;
the data combination process unit is configured to: when the previous data of the resent data are stored in the on-chip memory, read the previous data from the on-chip memory, combine the resent data and the previous data thereof to obtain combined data; or else, read the previous data corresponding to the resent data from the off-chip memory, and combine the resent data and the previous data to obtain the combined data.

13. The system according to claim 12, wherein,
the HARQ controller is further configured to: when the previous data are in the on-chip memory, store the combined data of the coded block obtained by the data combination process unit into a storage block in which the previous data are stored; when the previous data are in the off-chip memory, search the on-chip memory for any overlayable storage block, and if there exists an overlayable storage block, store the combined data of the coded block into the storage block and set a using status bit corresponding to the storage block to be un-overlayable; if there is no overlayable storage block, store the combined data of the coded block into the off-chip memory; when the combined data of the coded block are checked and pass the check, set the using status bit corresponding to the storage block in which the combined data of the coded block are stored to be overlayable.

14. The system according to claim 12, wherein, the judging unit comprises a tag register and a tag comparator,
each storage block in the on-chip memory corresponds to a tag in the tag register, and identification information of the coded block stored in the storage block is stored in the tag;
the tag comparator is configured to: when receiving an instruction of the HARQ controller, search for any tag corresponding to the identification information of the coded block exists, and send a searching result to the data combination process unit;
the data combination process unit is further configured to: when a tag corresponding to the identification information of the coded block exists in the tag register, read the previous data of the coded block from the storage block corresponding to the tag; combine the resent data with the previous data; or else, read the previous data corresponding to the resent data from the off-chip memory, and combine the resent data with the previous data.

15. The system according to claim 14, wherein, the identification information is a process number of the coded block and a coded block number.

16. The system according to claim 11, wherein,
the HARQ processor further comprises an enforced processing register, which is configured to: store an enforced processing identifier, which is used to indicate whether to perform enforced combination processing;
the HARQ controller is further configured to: when receiving the resent data of the coded block, obtain the enforced processing identifier, and if the enforced processing identifier indicates to perform enforced combination processing, perform combination processing on of the resent data and the previous data; or else, obtain the check status identification information of the coded block, and judge whether to perform combination processing on the resent data and the previous data according to the check status identification information of the coded block.

17. The system according to claim 11, wherein, the check is a cyclic redundancy check.

18. The system according to claim 13, wherein, the judging unit comprises a tag register and a tag comparator,
each storage block in the on-chip memory corresponds to a tag in the tag register, and identification information of the coded block stored in the storage block is stored in the tag;
the tag comparator is configured to: when receiving an instruction of the HARQ controller, search for any tag corresponding to the identification information of the coded block exists, and send a searching result to the data combination process unit;
the data combination process unit is further configured to: when a tag corresponding to the identification information of the coded block exists in the tag register, read the previous data of the coded block from the storage block corresponding to the tag; combine the resent data with the previous data; or else, read the previous data corresponding to the resent data from the off-chip memory, and combine the resent data with the previous data.

19. The system according to claim 18, wherein, the identification information is a process number of the coded block and a coded block number.

* * * * *